United States Patent
Guha (10) Patent No.: US 11,691,359 B2
(45) Date of Patent: Jul. 4, 2023

(54) MULTIPLE LAYER ARTICLE WITH INTERACTIVE REINFORCEMENTS LINEAR RIBBON FIBER REINFORCEMENT FOR COMPOSITE FORMS

(71) Applicant: COATS & CLARK, INC., Charlotte, NC (US)

(72) Inventor: Probir Kumar Guha, Bloomfield Hills, MI (US)

(73) Assignee: J. & P. Coats Limited, Uxbridge (GB)

( * ) Notice: Subject to any disclaimer, the term of this patent is extended or adjusted under 35 U.S.C. 154(b) by 102 days.

(21) Appl. No.: 16/982,751

(22) PCT Filed: Mar. 19, 2019

(86) PCT No.: PCT/US2019/022931
§ 371 (c)(1),
(2) Date: Sep. 21, 2020

(87) PCT Pub. No.: WO2019/183064
PCT Pub. Date: Sep. 26, 2019

(65) Prior Publication Data
US 2021/0008816 A1    Jan. 14, 2021

Related U.S. Application Data

(60) Provisional application No. 62/644,692, filed on Mar. 19, 2018.

(51) Int. Cl.
*B32B 7/09* (2019.01)
*B29C 70/46* (2006.01)
(Continued)

(52) U.S. Cl.
CPC ............ *B29C 70/46* (2013.01); *B29C 43/222* (2013.01); *B29C 43/305* (2013.01); *B29C 70/24* (2013.01);
(Continued)

(58) Field of Classification Search
CPC ........................................................ B32B 7/09
See application file for complete search history.

(56) References Cited

U.S. PATENT DOCUMENTS

| 4,773,952 A | * | 9/1988 | Wesley, Jr. | ............ B29C 53/602 220/62.19 |
| 6,666,310 B1 | * | 12/2003 | Berreth | ................. F16D 69/023 188/218 XL |

(Continued)

FOREIGN PATENT DOCUMENTS

| CN | 101600550 A | 12/2009 |
| CN | 104567552 A | 4/2015 |

(Continued)

OTHER PUBLICATIONS

Int'l Search Report for PCT/US2019/022931, dated Jul. 3, 2019.

*Primary Examiner* — Andrew T Piziali
(74) *Attorney, Agent, or Firm* — MaxGoLaw PLLC (57) ABSTRACT

A form for a thin reinforced composite material includes a plurality of separate linear fiber strips, each having a rectangular cross section composed of reinforcement fibers. The linear fiber strips laid out in a two-dimensional base layer defining a shape of the form. A first successive layer formed with the plurality of separate linear fiber strips contacting the base layer, the linear fiber strips laid out in the first successive layer interspersed from the separate linear fiber strips in the two-dimensional base layer. A method of forming the form includes arranging the plurality of separate linear fiber strips on a substrate and tacking the plurality of separate linear fiber strips to the substrate with a plurality of stitches. A method of forming a unitary reinforced composite component from the form is further provided. The resulting component having high strength and light weight and being efficient to manufacture.

17 Claims, 11 Drawing Sheets

(51) Int. Cl.
  *B29C 43/22* (2006.01)
  *B29C 43/30* (2006.01)
  *B29C 70/24* (2006.01)
  *B32B 5/26* (2006.01)
  *B32B 9/04* (2006.01)
  *B32B 17/02* (2006.01)
  *B32B 27/12* (2006.01)

(52) U.S. Cl.
  CPC ............... *B32B 5/26* (2013.01); *B32B 7/09* (2019.01); *B32B 9/047* (2013.01); *B32B 17/02* (2013.01); *B32B 27/12* (2013.01)

(56) References Cited

U.S. PATENT DOCUMENTS

| | | |
|---|---|---|
| 8,758,874 B2 | 6/2014 | Taketa et al. |
| 2004/0074589 A1* | 4/2004 | Gessler ............... B29C 70/226 156/247 |
| 2006/0252334 A1* | 11/2006 | LoFaro ............... B32B 7/10 442/361 |
| 2009/0050259 A1 | 2/2009 | Paul et al. |
| 2013/0142988 A1* | 6/2013 | Grelin ............... B29C 70/086 264/258 |

FOREIGN PATENT DOCUMENTS

| | | |
|---|---|---|
| WO | 2007010052 A1 | 1/2007 |
| WO | 2015157175 A1 | 10/2015 |

\* cited by examiner

MULTIPLE LAYER ARTICLE WITH INTERACTIVE REINFORCEMENTS LINEAR RIBBON FIBER REINFORCEMENT FOR COMPOSITE FORMS

RELATED APPLICATIONS

This application claims priority benefit of U.S. Provisional Application Ser. No. 62/644,692 filed 19 Mar. 2018, the contents of which are hereby incorporated by reference.

FIELD OF THE INVENTION

The present invention in general relates to composite components and in particular to linear ribbon fiber reinforced composite components, and a method of construction thereof.

BACKGROUND OF THE INVENTION

Weight savings in the automotive, transportation, and logistics-based industries has been a major focus in order to make more fuel-efficient vehicles both for ground and air transport. In order to achieve these weight savings, light weight composite materials have been introduced to take the place of metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for many reasons: common examples include materials which are stronger, lighter, or less expensive when compared to traditional materials.

Composite materials are engineered or naturally occurring materials made from two or more constituent materials with significantly different physical or chemical properties which remain separate and distinct at the macroscopic or microscopic scale within the finished structure. There are two categories of constituent materials: matrix and reinforcement. At least one portion of each type is required. The matrix material surrounds and supports the reinforcement materials by maintaining their relative positions. The reinforcements impart their special mechanical and physical properties to enhance the matrix properties. A synergism produces material properties unavailable from the individual constituent materials, while the wide variety of matrix and strengthening materials allows the designer of the product or structure to choose an optimum combination.

Commercially produced composites often use a polymer matrix material that is either a thermoplastic or thermoset resin. There are many different polymers available depending upon the starting raw ingredients which may be placed into several broad categories, each with numerous variations. Examples of the most common categories for categorizing polymers include polyester, vinyl ester, epoxy, phenolic, polyimide, polyamide, polypropylene, PEEK, and others.

The use of fiber and particulate inclusions to strengthen a matrix is well known to the art. Well established mechanisms for the strengthening include slowing and elongating the path of crack propagation through the matrix, as well as energy distribution associated with pulling a fiber free from the surrounding matrix material. In the context of sheet molding composition (SMC) formulations, bulk molding composition (BMC) formulations, and resin transfer molding (RTM); hereafter referred to collectively as "molding compositions", fiber strengthening has traditionally involved usage of chopped glass fibers. There is a growing appreciation in the field of molding compositions that replacing in part, or all of the glass fiber in molding compositions with carbon fiber can provide improved component properties.

The use of carbon fibers (CF) in composites, sheet molding compositions, and resin transfer molding (RTM) results in formed components with a lower weight as compared to glass fiber reinforced materials. The weight savings achieved with carbon fiber reinforcement stems from the fact that carbon has a lower density than glass and produces stronger and stiffer parts at a given thickness.

Fiber-reinforced composite materials can be divided into two main categories normally referred to as short fiber-reinforced materials and continuous fiber-reinforced materials. Continuous reinforced materials often constitute a layered or laminated structure. The woven and continuous fiber styles are typically available in a variety of forms, being pre-impregnated with the given matrix (resin), dry, uni-directional tapes of various widths, plain weave, harness satins, braided, and stitched. Various methods have been developed to reduce the resin content of the composite material, by increasing the fiber content. Typically, composite materials may have a ratio that ranges from 60% resin and 40% fiber to a composite with 40% resin and 60% fiber content. The strength of a product formed with composites is greatly dependent on the ratio of resin to reinforcement material.

Figure 1:
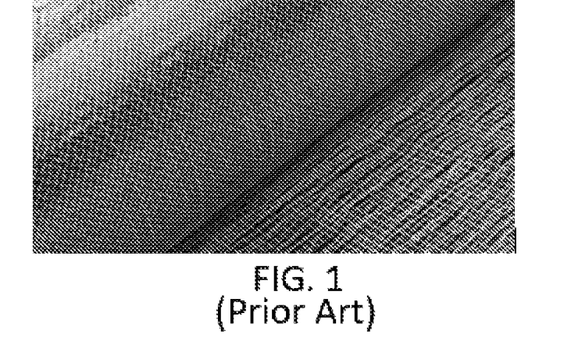
FIG. 1 is a photograph of an example of a non-crimp fabric (NCF)

Non-crimp fabrics (NCF), an example of which is shown in FIG. 1, are types of "engineered fabrics" designed to reinforce polymeric composites that are made up of multiple layers or fibers stitched together. Commonly used NCF's are biaxial, triaxial and quadriaxial fabrics, where the fiber tows are straight and with different orientations (0, 45, 90 degrees) to provide multidirectional properties. The combination of multiple layers of fibers, stacked in just one fabric, leads to faster and cheaper preform production processes as compared to unilayer based processes. NCF also has advantages for liquid composite molding (LCM) methods, as NCF presents better draping over a form due to the good deformability of unidirectional plies versus woven fabrics that are undulated (crimp). An additional advantage of the NCF reinforced composites is that NCF generally features better mechanical properties as the tows are not crimped or woven. Furthermore, the delamination of resistance and impact strength of the NCF reinforced composites are also improved.

Figure 2:
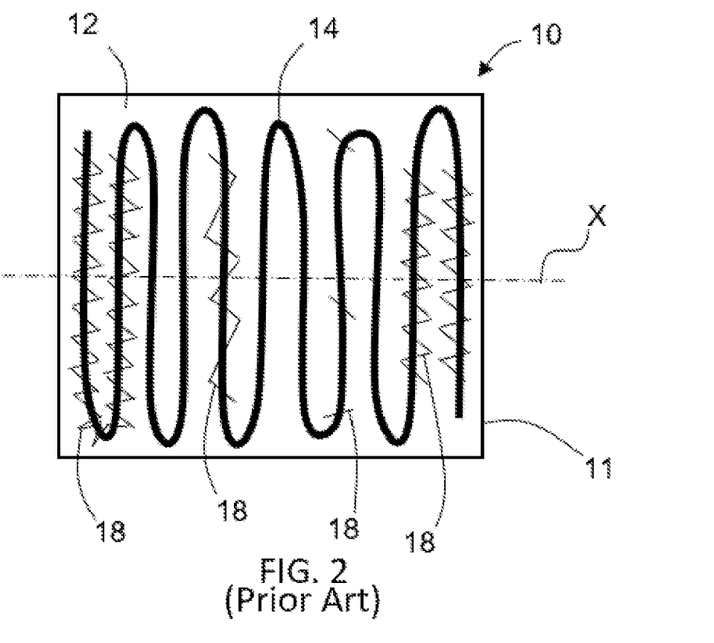
FIG. 2 is a prior art schematic view of a fiber bundle stitched to a substrate forming a fiber preform.

Tailored Fiber Placement (TFP) is a textile manufacturing technique in which fibrous material is arranged on another piece of base material and is fixed with an upper and lower stitching thread on the base material. The fiber material may be placed in curvilinear patterns of a multitude of shapes upon the base material. Layers of the fiber material may be built up to produce a two-dimensional fiber preform insert, which may be used as an insert for overmolding or resin transfer molding to create composite materials. As shown in FIG. 2, and as disclosed in U.S. Provisional Application No. 62/486,166 filed on 17 Apr. 2017, a fiber preform 10 includes a substrate 12 which acts as a foundation or base upon which a fiber bundle 14 is applied. The substrate 12 may be a tear-off fabric or paper or other suitable material. The fiber bundle 14 is applied to the substrate 12 by a selective comingled fiber bundle positioning (SCFBP) method and attached to the substrate 12 by a plurality of stitches 18 of a thermoplastic thread. The fiber bundle 14 may be applied in any arrangement on the substrate 12. The arrangement of the fiber bundle 14 on the substrate 12 may generally resemble the shape of the designed final composite material component, for example a structural component of an automobile. The fiber bundle 14 may be arranged in a principal direction, i.e., a principal direction of stress of the final composite material component. In FIG. 2, the principal orientation of the fiber bundle 14 is along a longitudinal axis X of the fiber preform 10, however, other suitable orientations are also possible and may be used based on the design considerations and stresses for each composite material part. FIG. 2 illustrates only a first preform layer 11, however, additional layers may be built above the first layer.

Figure 3:
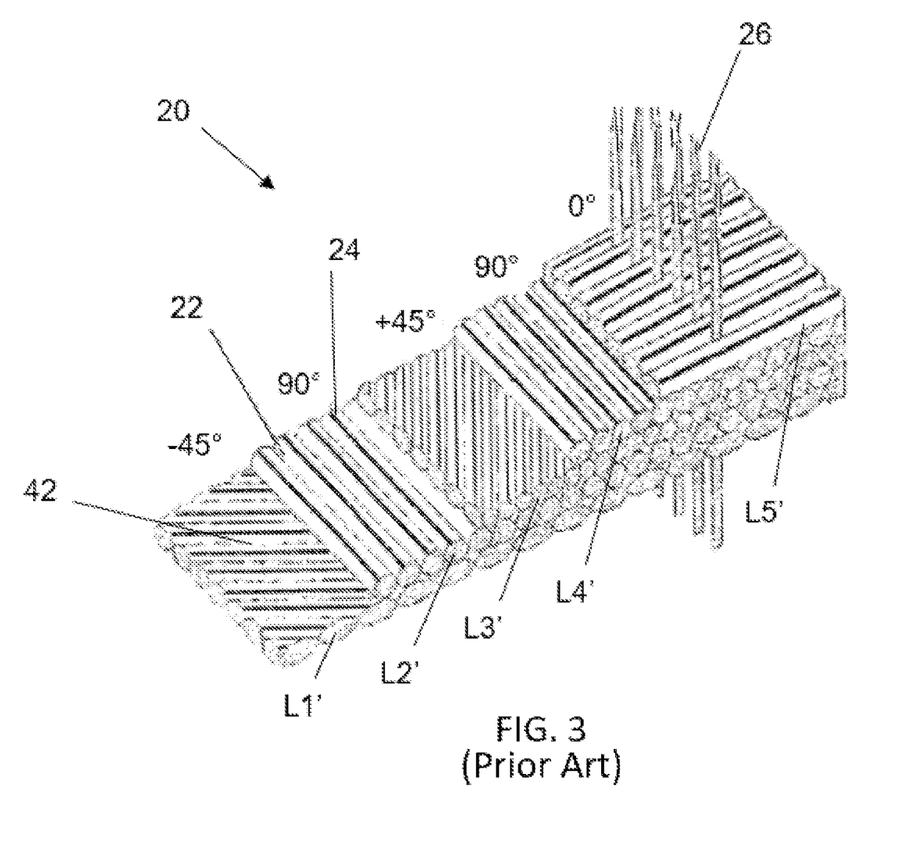
FIG. 3 is a perspective prior art view of a woven carbon and soluble fiber configuration with soluble stitching formed using selective comingled fiber bundle positioning (SCFBP)

FIG. 3 is a perspective prior art view of a selective commingled fiber bundle positioning (SCFBP) assembly 20 formed of woven carbon 22 and organic fibers 24 retained with stitching 26. The angles of the individual layers (L1', L2', L3', L4', L5') of woven carbon 22 and fiber 24 are varied during the lay-up process as disclosed in co-pending U.S. Provisional Application. Commingled reinforcing fibers, illustratively include those made of carbon, glass, or aramid fibers, and thermofusible fibers which serve to provide a matrix in a composite material made of both reinforcing and matrix fibers. The matrix fibers, being of a thermofusible nature may be formed from material such as, for example, polyamide, polypropylene, polyester, polyether ether ketone, polybenzobisoxazole, or liquid crystal polymer. The reinforcing fibers may also be of a material that is meltable with the proviso that melting occurs at a temperature which is higher than the matrix fibers so that, when both fibers are used to create a composite, at the temperature point at which melting of the matrix fibers occurs, the state of the reinforcing fibers is unaffected. As readily seen in FIG. 3 the woven commingled fiber bundles provide a relatively thick or built up assembly.

While there have been many advancements in composite reinforcement and composite manufacturing, there continues to be a need for thin reinforced composite materials that are of high strength and light weight that are also efficient to manufacture.

SUMMARY OF THE INVENTION

A form for a thin reinforced composite material having high strength and light weight that is efficient to manufacture, a method for forming such a form, and a method for forming a unitary reinforced composite component from such a form are provided.

The form includes a plurality of separate linear fiber strips, each having a rectangular cross section with a width and a thickness being composed of reinforcement fibers. The reinforcement fibers being glass fibers, aramid fibers, carbon fibers, or a combination thereof. The plurality of linear fiber strips are laid out in a two-dimensional base layer that defines a shape of the form. A first successive layer formed with the plurality of separate linear fiber strips is formed in contact with the two-dimensional base layer, the plurality of separate linear fiber strips laid out in the first successive layer so as to be interspersed from the plurality of separate linear fiber strips in the two-dimensional base layer. According to embodiments, the plurality of separate linear fiber strips in the first successive layer may be angularly displaced relative to the plurality of separate linear fiber strips in the two-dimensional base layer. Additionally, the form may include one to eighteen additional successive layers placed on the first successive layer. In each of the additional one to eighteen layers the plurality of separate linear fiber strips are interspersed.

The method of forming the form includes arranging the plurality of separate linear fiber strips on a substrate and tacking the plurality of separate linear fiber strips to the substrate with a plurality of stitches. According to embodiments, the plurality of stitches of a thermoplastic thread and may be present in an amount of 0.1 to 7 weight percent of the plurality of separate linear fiber strips.

The method of forming a unitary reinforced composite component from the form includes placing the form onto a mold platen, heating the form to promote fusion of a plurality of thermoplastic fibers therein, cooling the form until solidified with contours of the component, and removing the vehicle component from the mold platen.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

The present invention has utility for the formation of thin composites formed with linear strips or ribbons of fiber for reinforcement that are of high strength and light weight, and that are also efficient to manufacture. In inventive embodiments the position of reinforcement strips between adjacent layers are interspersed from each other. Unlike existing woven reinforcement fibers with a circular or oval cross section, the individual fibers of a fiber bundle are spread to form a rectangular cross section with a lower thickness (height above a substrate) as compared to circular or oval cross sections. This allows for the formation of composites with a thickness and structural performance on par with prepreg and composites using non-crimp fabrics (NCF). For example, currently NCF and prepreg are able to yield 1.3 mm thickness parts while using 8 layers of fiber with orientations of 45/−45/90/0/0/90/−45/45° using 50K tow carbon fiber (CF). However, a similar design using woven 50K CF with a circular cross section yields a composite structure of approximately 4 mm, and only a four-layer construction would have a thickness on par with NCF but would lack quasi-isotropic properties. Alternatively, a 12K or less CF tow may be used but this would increase the cost of the preform by at least 30%.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, the term melting as used with respect to thermoplastic fibers or thread is intended to encompass both thermofusion of fibers such that a vestigial core structure of separate fibers is retained, as well as a complete melting of the fibers to obtain a homogenous thermoplastic matrix.

Embodiments of the invention utilize staggered fiber paths and employ a fiber laying technique that increases the width of the 50K tow during a stitching process to a substrate layer. Currently, pending in an application entitled "Thread" filed on or about 9 Mar. 2017, the contents of which are hereby incorporated by reference. In an inventive embodiment a pneumatic device may be used to open up the fiber being feed to a stitching mechanism. Using these techniques an eight-layer configuration using ribbons or strips of fiber, yields a molded panel thickness of 1.35 mm or less. Furthermore, the use of ribbons or strips of fiber results in lower fiber wastage and lower direct labor in preparation of a preform or charge pattern as compared to NCF. For example, for a lattice based on strips or ribbon of CF a preform is 100 parts by weight, while NCF is 150 parts by weight, and prepreg is 225 parts by weight.

Figure 4:
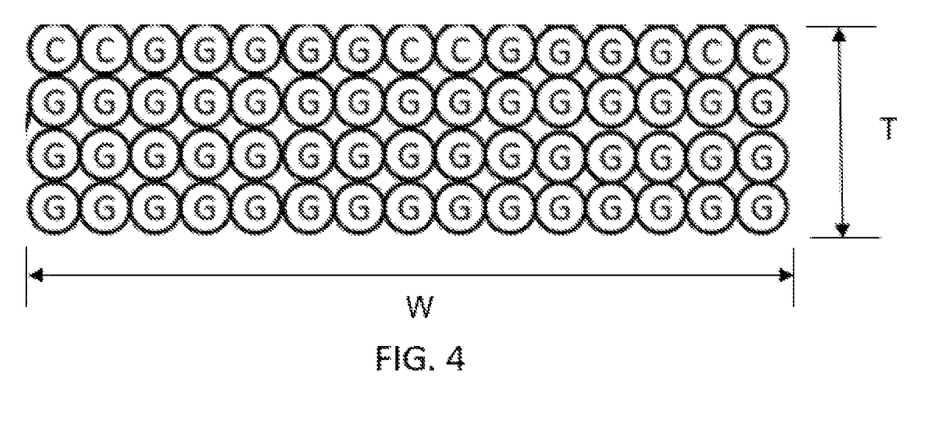
FIG. 4 illustrates a cross sectional view of a commingled ribbon or strip of reinforcing fibers in accordance with embodiments of the invention.
Figure 5A:
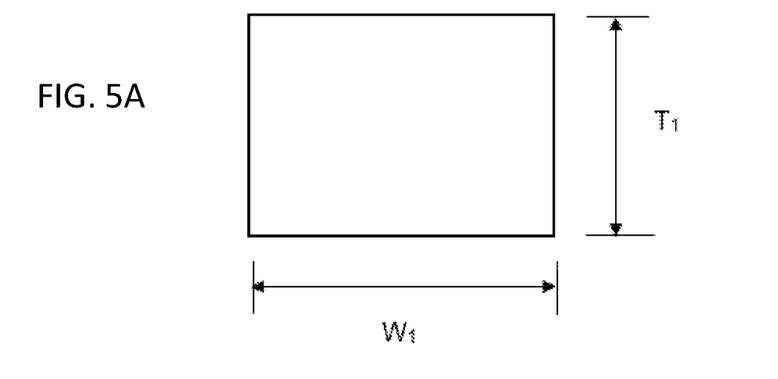
FIGS. 5A-5C illustrate varying cross-sectional aspect ratios of a ribbon or strip of reinforcing fibers in accordance with embodiments of the invention.
Figure 5B:
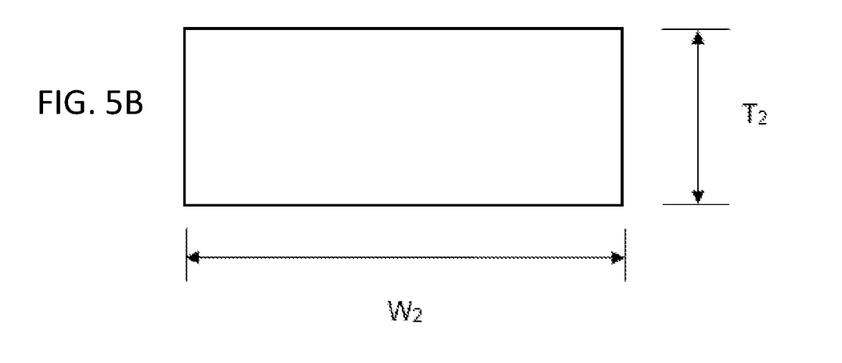
Figure 5C:
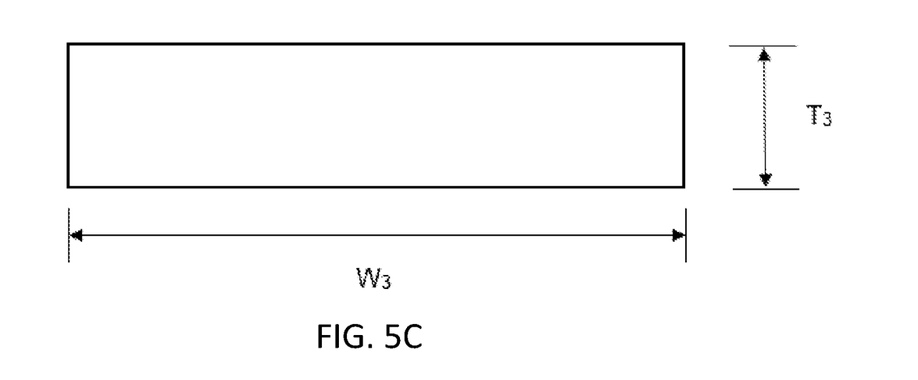
Figure 6A:
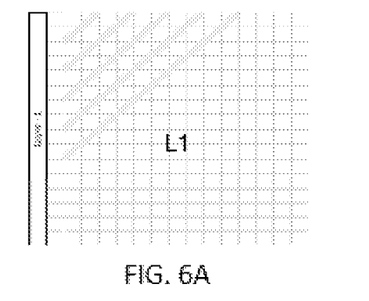
FIGS. 6A-6H illustrate interspersed patterns of eight layers of reinforcing ribbons or strips in accordance with embodiments of the invention.
Figure 6B:
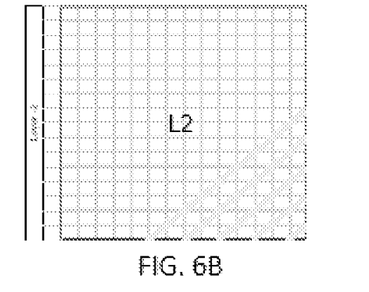
Figure 6C:
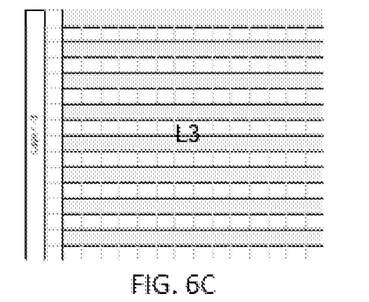
Figure 6D:
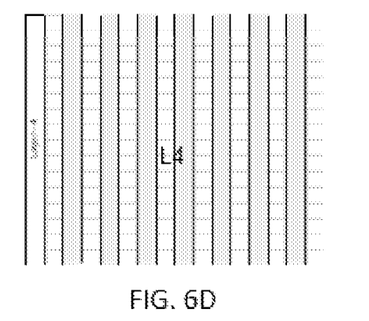
Figure 6E:
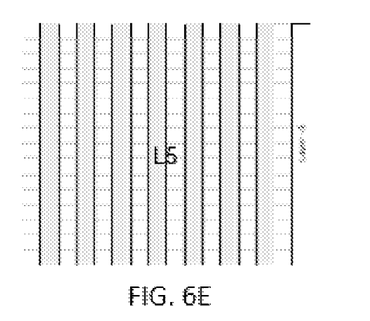
Figure 6F:
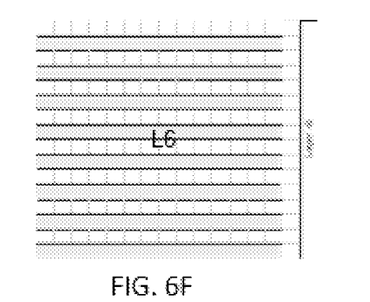
Figure 6G:
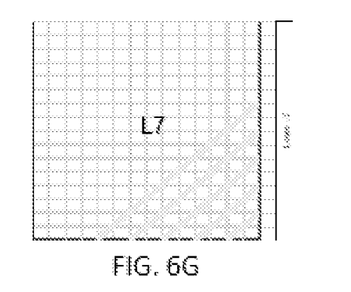
Figure 6H:
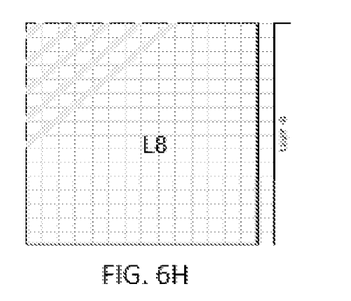

FIG. 4 illustrates a fiber strip or ribbon formed with strands of carbon and strands of glass. It is appreciated that the reinforcing fiber strips or ribbons may be made of a single fiber type or may be a collection of commingled fibers as shown in FIG. 4. The thickness T of the reinforcement fiber strips may be varied by changing the cross-sectional aspect ratio with respect to thickness T and width W as shown in FIGS. 5A-5C while maintaining a constant cross-sectional area (W times T).

Figure 7:
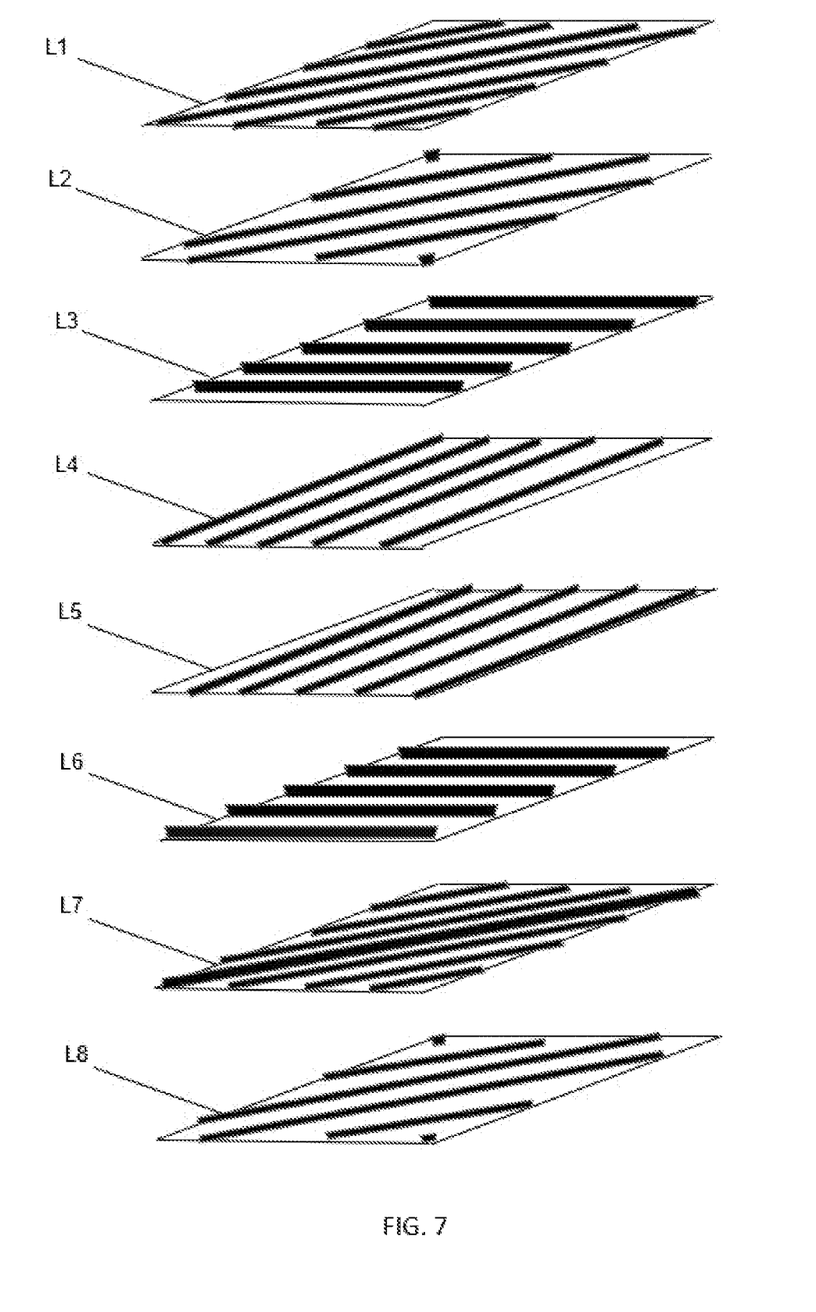
FIG. 7 illustrates an exploded view of an eight-layer reinforced composite structure using the layers of interspersed patterns of reinforcing ribbons or strips shown in FIGS. 6A-6H in accordance with embodiments of the invention.

FIGS. 6A-6H illustrate an inventive embodiment of interspersed patterns of eight layers of reinforcing ribbons or strips of rectangular cross section that form a composite sheet. Each of the individual layers 6A-6H may have a single type of reinforcing strips on a layer surface such as strips made of commingled fibers or strips made up of a single fiber type. In specific inventive embodiments, each of the individual layers may have a mixture of commingled fiber strips and strips made up of a single fiber type, or different fiber types in separate strips on the layer. FIG. 7 illustrates an exploded view of an eight-layer reinforced composite structure using the interspersed patterns of reinforcing ribbons or strips as shown in FIGS. 6A-6H. As may be seen in FIGS. 6A-6H and in FIG. 7 the interspersed patterns of eight layers of reinforcing ribbons or strips of rectangular cross section that form a composite sheet in the layers are offset from each other in pairs. For example, the horizontal stripe pattern in layer 3 (L3) and layer 6 (L6) are offset from each other; the vertical stripe pattern in adjacent layer 4 (L4) and layer 5 (L5) are offset from each other; and the diagonal stripe pattern in adjacent layer 1 (L1) and layer 2 (L2) are offset from each other, as are the diagonal stripe pattern in adjacent layer 7 (L7) and layer 8 (L8) are offset from each other.

Figure 8:
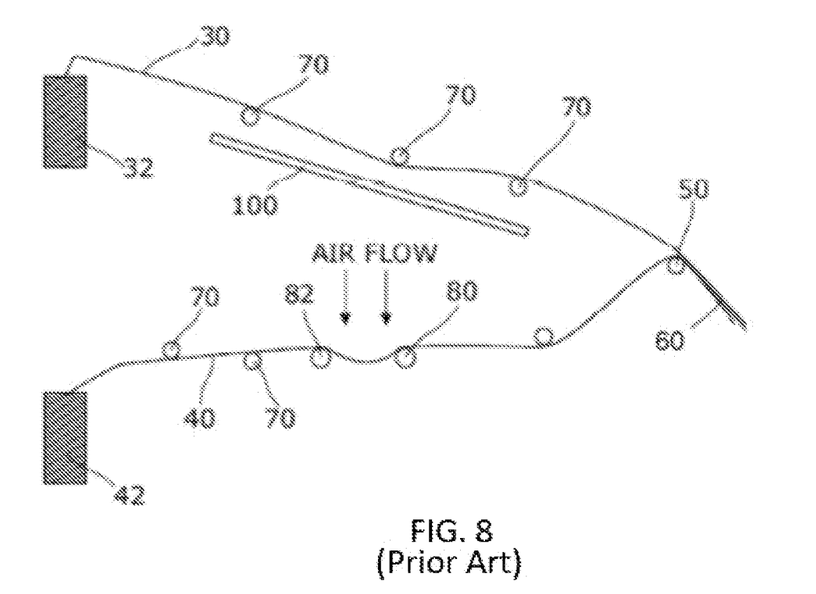
FIG. 8 is a side view of a prior art apparatus for manufacturing strips or ribbons of reinforcing fibers.

A co-pending application to the same applicant discloses an apparatus that is shown in FIG. 8 for manufacturing commingled fibers or a single fiber types as a strip or ribbon 60 made up of reinforcing fibers, illustratively including those made of carbon, glass, or aramid fibers, recycled, and thermofusible fibers which serve to provide a matrix in a composite material made of both reinforcing and matrix fibers. The matrix fibers, being of a thermofusible nature may be formed from material such as, for example, polyamide, polypropylene, polyester, polyether ether ketone, polybenzobisoxazole, or liquid crystal polymer. The reinforcing fibers may also be of a material that is meltable with the proviso that melting occurs at a temperature which is higher than the matrix fibers so that, when both fibers are used to create a composite, at the temperature point at which melting of the matrix fibers occurs, the state of the reinforcing fibers is unaffected.

Figure 9:
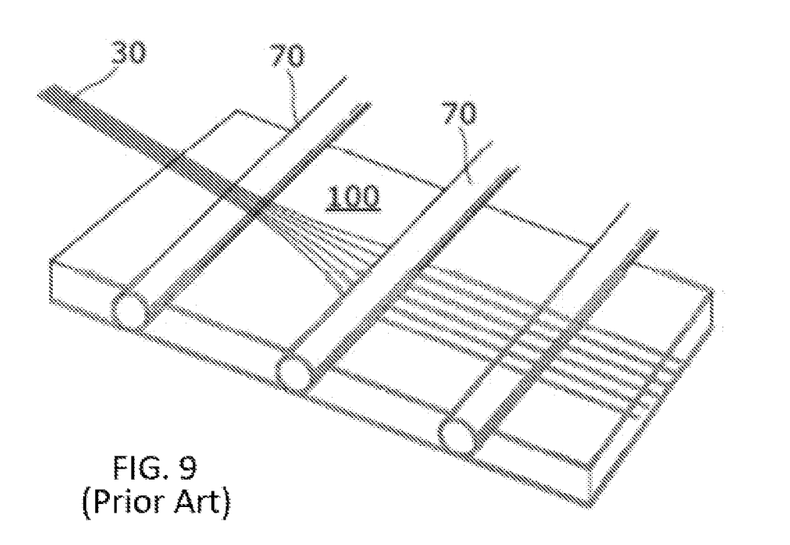
FIG. 9 is a perspective view of a detail of the prior art apparatus of FIG. 8 for spreading the fibers.

The thermoplastic and reinforcing carbon fibers are each fed from individual tows 30, 40 of pure thermoplastic fibers 30 and carbon fibers 40 and combined to form the roving 60 at a blending roller 50. The thermoplastic fibers are first drawn off a spool 32 to form the tow 30. Subsequently, the thermoplastic fibers of the tow 30 pass over and under a sequence of guide rollers 70 during which time the fibers are spread. The carbon fibers of the tow 40 are drawn off spool 42 and guided by guide rollers 70. Referring additionally to FIG. 9, the spreading of the thermoplastic fibers is created by the use of static electricity. Accordingly, as the thermoplastic tow 30 is drawn over and under the guide rollers 70 it passes over a charged plate 100. The electrostatic charge on the plate 100 causes mutual dispersal of the fibers due to electrostatic repulsion between them as a consequence of the charge acquired during their passage over the plate 100.

Figure 10:
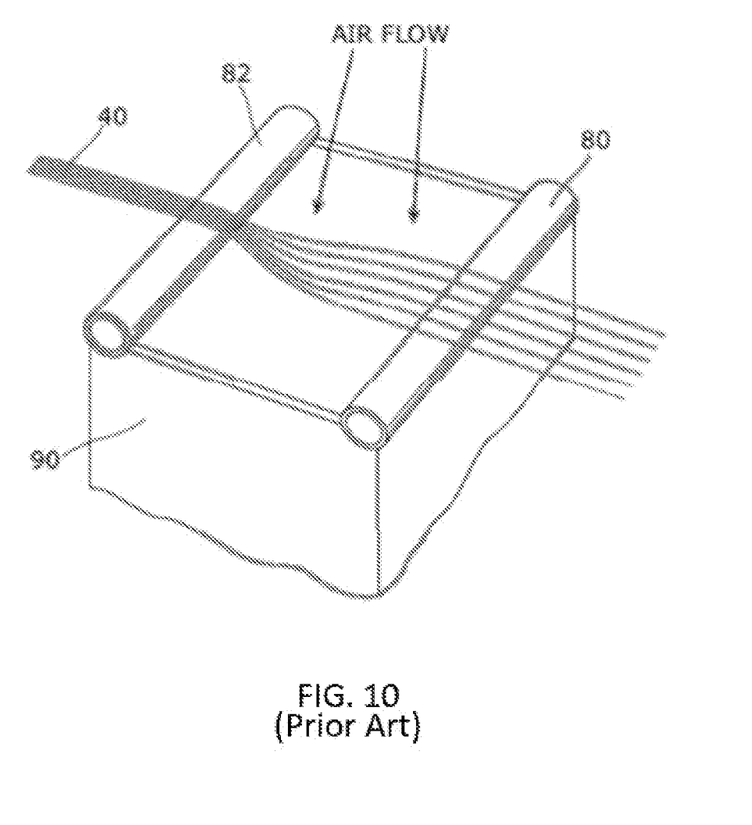
FIG. 10 is a perspective view of a further detail of the prior art apparatus of FIG. 8 for spreading the fiber.

Referring additionally to FIG. 10, the carbon fibers of tow 40 are spread by the use of a flow of air passing over the tow 40 which has the action of dispersing the fibers. The air flow passes transverse, and preferably substantially orthogonally to the length of the fibers of the tow 40. The air flow has the action of urging the tow 40 against a supporting surface and, as a consequence, of dispersing the fibers of the tow across that surface. The supporting surface extends transversely, and preferably substantially orthogonally to the length of the fibers (and therefore the motion of the tow) and a supporting surface is provided by a cylindrical mandrel 80. A further supporting surface, provided by a further mandrel 82 is provided upstream of the mandrel 80 and the action of the air flow in combination with the surfaces have, as a consequence of the fibers of the tow being urged against them by the air flow, a dispersing effect upon the fibers of the tow. The air flow is created by an air pressure differential across the movement of the tow 40 and the extent of the dispersal of the fibers on the supporting surface or surfaces is related to the air pressure gradient in the region of the tow 40 and supporting surfaces (80, 82). The spread fibers are subsequently formed to a ribbon or strip.

Figure 11:
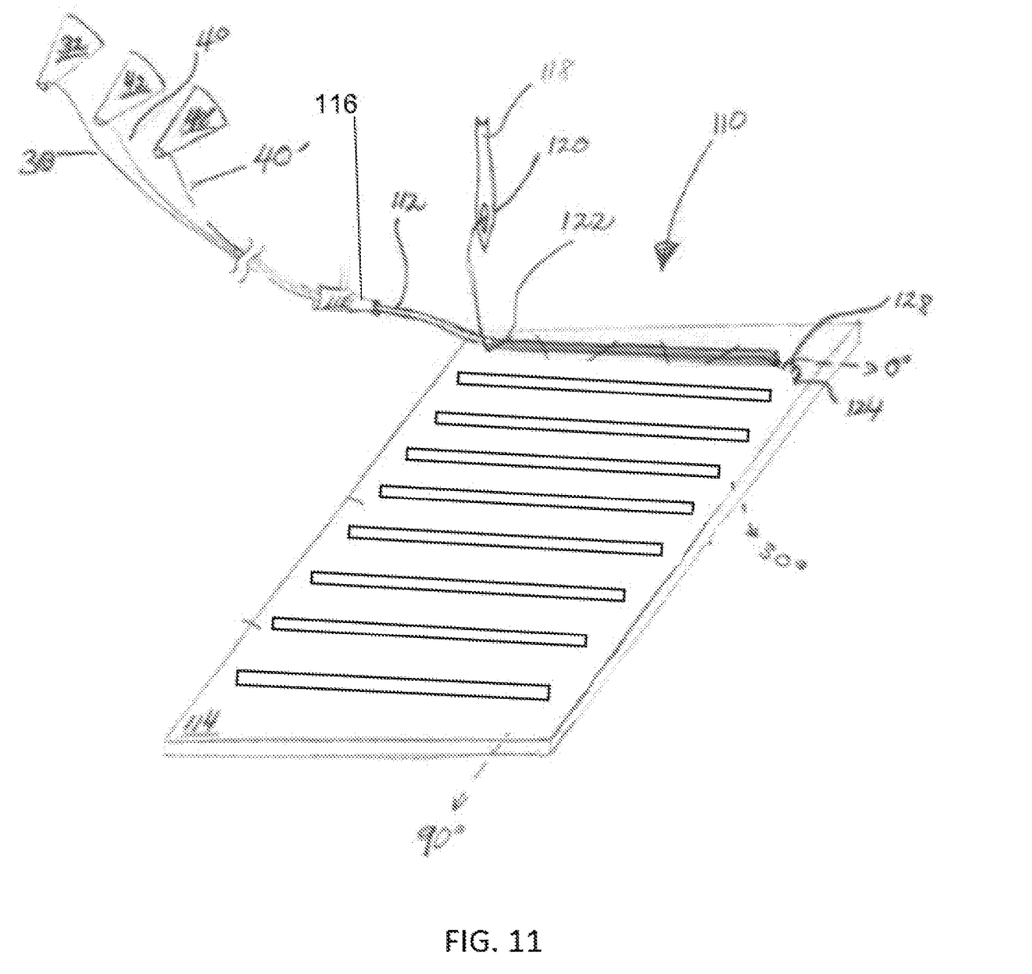
FIG. 11 is a schematic illustrating the application and stitching of ribbons or strips of reinforcing fibers to a substrate in accordance with embodiments of the invention.

FIG. 11 is a schematic illustrating the application and stitching of ribbons or strips of reinforcing fibers 112 to a substrate 114. The comingled fiber or single type fiber bundle 112 is conveyed to a substrate 114 by a guide pipe 116 to lay out the comingled fiber bundle or single type fiber 112 in predetermined pattern on the substrate 114. A conventional sewing machine head operating a needle 118 with a top thread 120 tacks the fiber bundle 112 with stitches 122. A bobbin below the substrate 114, including a bobbin with a lower thread are not shown, and are conventional to sewing machines. The top thread 120 and the bottom thread are thermoplastic threads. In certain inventive embodiments, the comingled fiber bundle 112 is laid out in a base layer 124 in generally parallels lines with a given orientation. In addition to the substantially linear pattern of fiber bundles positioned as depicted in FIG. 11, it is appreciated that other patterns operative herein illustratively include spirals, and any space filling curve such as a Peano curve, dragon curve, or Sierpinksi curve.

If zero degrees is defined as the long axis of the base layer 124, the subsequent layers are overlaid at angles of 0-90°. For example, an angular displacement between adjacent layers is 45° resulting in a 0-45-90-45-0 pattern of layers. Further specific patterns illustratively include 0-45-90-45-0, 0-45-60-60-45-0, 0-0-45-60-45-0-0, 0-15-30-45-60-45-30-15-0, and 0-90-45-45-60-60-45-45-90-0. While these exemplary patterns are for from 5 to 10 layers of directional SCFBP, it is appreciated that the form 110 may include from 3 to 20 layers. It is appreciated that the form layers may be symmetrical about a central layer, in the case of an odd number of layers, or about a central latitudinal plane parallel to the players.

The stitching 122 is applied with a preselected tension, stitching diameter, stitch spacing. The stitching 122 is typically present in an amount of from 0.1 to 7 weight percent of the fiber bundle 112.

While FIG. 11 only shows a single layer, it is appreciated that a form 110 is readily formed with up to 20 layers with the only technical limit being the length of the travel of the needle 118.

It is appreciated that while only linear patterns for the reinforcement strips or ribbons have been shown that additional patterns may be formed with reinforce strips with rectangular cross sections. In specific inventive embodiments Moire patterns may be used to provide localized reinforcement through the use of overlap of reinforcement strips between layers. Various overlapping reinforcement regions may be produced by offsetting layered patterns of the reinforcement strips.

Figure 12A:
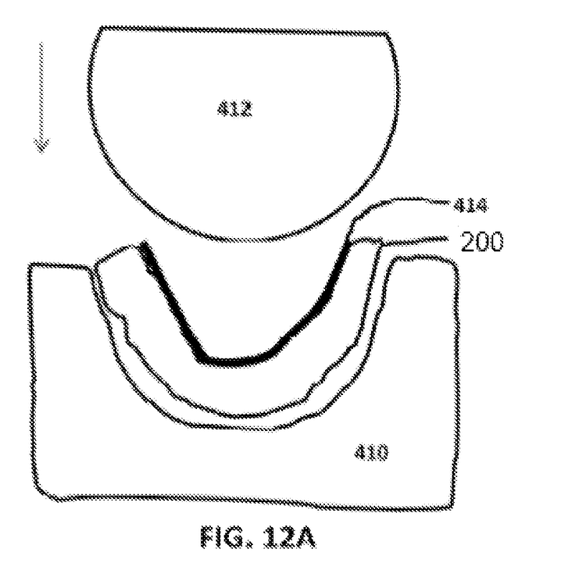
FIGS. 12A-C are a sequence of schematic steps of processing an inventive SCFBP form into a vehicle component by melting thermoplastic content of the SCFBP form.
Figure 12B:
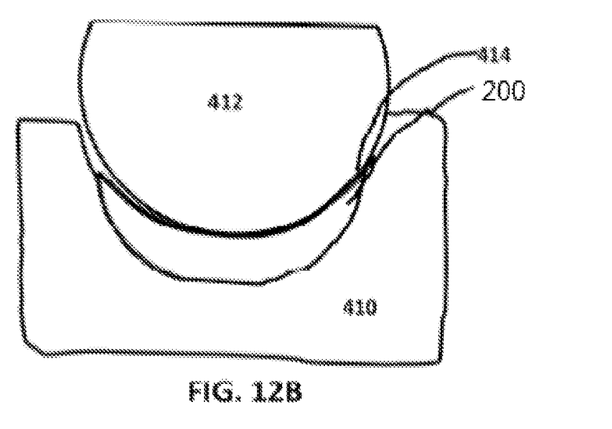
Figure 12C:
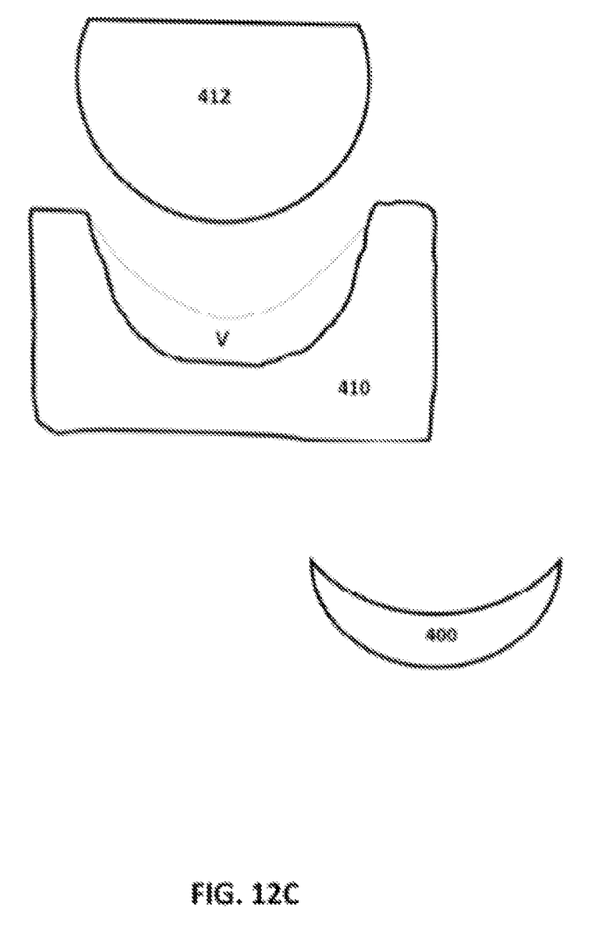

FIG. 12A-C are a series of schematics showing a melt formation of a vehicle component 400. In FIG. 12A a form 200 such as that shown in FIG. 7 is brought into simultaneous contact with opposing mold platens 410 and 412 that define a cavity volume, V. The volume V corresponding in shape to the desired vehicle component. By selectively heating one or both of the platens 410 or 412 to a temperature sufficient to melt the thermoplastic content of the form 200 or a combination thereof, a vehicle component is formed upon cooling the mass compressed within the platens 410 and 412 by temperature and pressure, as shown in FIG. 12B. In a specific inventive embodiment, a thermoplastic veil 414 is in contact one or both platens 410 and 412 to create a skin on the resulting vehicle component. Upon opening the volume V, a completed vehicle component 400 is removed.

The foregoing description is illustrative of particular embodiments of the invention but is not meant to be a limitation upon the practice thereof. The following claims, including all equivalents thereof, are intended to define the scope of the invention.

The invention claimed is:

1. A form for a component comprising:
   a plurality of separate linear fiber strips, each of said plurality of linear fiber strips having a rectangular cross section with a width and a thickness, each of said plurality of linear fiber strips being composed of reinforcement fibers, said reinforcement fibers being glass fibers, aramid fibers, carbon fibers, or a combination thereof, said plurality of linear fiber strips sewn to a two-dimensional base layer that defines a shape of the form, said plurality of linear fiber strips provided in a pattern; and
   a first successive layer of a successive layer plurality of separate linear fiber strips sewn to a first successive layer two-dimensional base layer, said first successive layer adapted to overlay said two-dimensional base layer;
   wherein the successive layer plurality of separate linear fiber strips are provided in the same pattern as said linear fiber strips, but the successive layer plurality of separate linear fiber strips are offset from said linear fiber strips.

2. The form of claim 1 further comprising one to eighteen additional successive layers placed on said first successive layer, where the plurality of said separate linear fiber strips are interspersed in said one to eighteen additional layers.

3. The form of claim 2 wherein said two-dimensional base layer, said first successive layer, and each of said one to eighteen additional successive layers have a mixture of commingled fiber strips and strips made up of a single fiber, or different fiber.

4. The form of claim 1 wherein the reinforcement fibers are exclusively only the glass fibers in at least one of said two-dimensional base layer or said first successive layer.

5. The form of claim 1 wherein the reinforcement fibers are exclusively only the carbon fibers in at least one of said two-dimensional base layer or said first successive layer.

6. The form of claim 1 wherein said plurality of separate linear fiber strips in said first successive layer is angularly displaced relative to said plurality of separate linear fiber strips in said two-dimensional base layer.

7. The form of claim 1 wherein the form is formed using selective comingled fiber bundle positioning (SCFBP), where the form is held together with a thermoplastic stitching.

8. The form of claim 1 wherein said plurality of separate linear fiber strips includes recycled fibers.

9. A method of forming a unitary reinforced composite component comprising:
   placing the form of claim 1 onto a mold platen,
   heating the form to promote fusion of a plurality of thermoplastic fibers therein;
   cooling the form until solidified with contours of the component; and
   removing the vehicle component from the mold platen.

10. The method of claim 9 further comprising applying a thermoplastic skin intermediate between the form and the mold platen.

11. The method of claim 9 further comprising applying a second opposing platen to apply pressure and sandwich the form.

12. The method of claim 9 wherein the unitary reinforced composite component is a vehicle component.

13. A method of forming the form of claim 1, comprising:
- arranging the plurality of separate linear fiber strips on a substrate; and
- tacking the plurality of separate linear fiber strips to the substrate with a plurality of stitches.

14. The method of claim 13 further comprising conveying the plurality of separate linear fibers strips to the substrate using a guide pipe.

15. The method of claim 13 wherein the plurality of stitches are of a thermoplastic thread.

16. The method of claim 13 wherein the plurality of stitches are formed by a sewing machine and needle.

17. The method of claim 13 wherein the plurality of stitches are present in an amount of 0.1 to 7 weight percent of the plurality of separate linear fiber strips.

* * * * *